(12) United States Patent
Lutzmann et al.

(10) Patent No.: US 7,541,400 B2
(45) Date of Patent: Jun. 2, 2009

(54) THERMOPLASTIC POLYACRYLONITRILE COMPOSITIONS

(76) Inventors: H. Harald Lutzmann, 2241 Briarwood Rd., Cleveland Hts., OH (US) 44118; James D. Idol, 8008 Parkridge Ct., Columbus, OH (US) 43235; Gerald W. Miller, 2165 Cable Car Ct., Cincinnati, OH (US) 45244

( * ) Notice: Subject to any disclaimer, the term of this patent is extended or adjusted under 35 U.S.C. 154(b) by 15 days.

(21) Appl. No.: 11/751,452

(22) Filed: May 21, 2007

(65) Prior Publication Data

US 2007/0270529 A1 Nov. 22, 2007

Related U.S. Application Data

(60) Provisional application No. 60/747,792, filed on May 20, 2006.

(51) Int. Cl.
*C08K 3/38* (2006.01)
*C08K 3/24* (2006.01)
*C08L 33/18* (2006.01)

(52) U.S. Cl. .................. 524/183; 524/248; 524/257; 524/320; 524/321; 524/385; 524/386; 524/387; 524/398; 524/399; 524/400; 524/449; 524/451; 524/516; 524/521; 524/565; 524/566

(58) Field of Classification Search .................. 525/50; 524/183, 248, 257, 320, 321, 385–387, 398, 524/399, 400, 449, 451, 516, 521, 565, 566
See application file for complete search history.

(56) References Cited

U.S. PATENT DOCUMENTS

| | | | |
|---|---|---|---|
| 2,617,783 A | 11/1952 | Slocombe et al. | |
| 2,617,784 A | 11/1952 | Slocombe et al. | |
| 2,635,090 A * | 4/1953 | Basdekis | 526/214 |
| 3,027,399 A * | 3/1962 | Merten | 560/2 |
| 3,940,405 A | 2/1976 | Serad | |
| 4,153,648 A | 5/1979 | Li et al. | |
| 4,195,135 A | 3/1980 | Li et al. | |
| 4,389,505 A | 6/1983 | Hungerford | |
| 4,914,138 A | 4/1990 | Percec et al. | |
| 5,004,783 A | 4/1991 | Percec et al. | |
| 5,055,520 A | 10/1991 | Percec et al. | |
| 5,304,590 A | 4/1994 | Merz et al. | |
| 5,434,205 A | 7/1995 | Fishman | |
| 5,861,442 A | 1/1999 | Merz et al. | |

FOREIGN PATENT DOCUMENTS

| | | | |
|---|---|---|---|
| JP | 58149937 | | 9/1983 |
| JP | 60092347 | | 5/1985 |
| JP | 60092349 | | 5/1985 |
| WO | WO 96/26968 | * | 9/1996 |

OTHER PUBLICATIONS

Sancaktar et al. "Effects of Calcium Carbonate, Talc, Mica, and Glass-Fiber Fillers on the Ultrasonic Weld Strength of Polypropylene" 2004, Journal of Applied Polymer Science, vol. 94, pp. 1986-1998.*

* cited by examiner

*Primary Examiner*—Fred M Teskin
(74) *Attorney, Agent, or Firm*—D. A. Stauffer; Barbara E. Arndt

(57) ABSTRACT

Thermoplastic compositions comprising polyacrylonitriles that contain greater than 90% acrylonitrile as monomer, or copolymers of such polyacrylonitriles with an olefinic unsaturated co-monomer, can be formed by the use of certain compatibilizers and/or thermal stabilizers. Other thermoplastic compositions comprising the high nitrile polyacrylonitriles can be obtained by melt blending the polyacrylonitriles with certain aromatic engineering thermoplastic polymers in the presence of compatibilizers and thermal stabilizers. All of the foregoing high nitrile compositions have been found to possess good optical and gas barrier properties, and good stress crack resistance.

14 Claims, No Drawings

THERMOPLASTIC POLYACRYLONITRILE COMPOSITIONS

CROSS-REFERENCE TO RELATED APPLICATIONS

This application claims the benefit of U.S. Provisional Patent Application No. 60/747,792 filed May 20, 2006 by Lutzmann, et al.

BACKGROUND OF THE INVENTION

Worldwide availability and low cost of acrylonitrile, along with low cost commercial polymerization processes, make polyacrylonitriles a desirable raw material for extrusion of films with excellent gas barrier properties. However, acrylonitrile polymers are generally not considered thermoplastic or melt processable because the melting point (heat distortion temperature) is higher than the temperature at which they decompose. That is, when heated, acrylonitrile polymers composed of 90 weight percent or more of acrylonitrile monomer will char before the melt can be processed at temperatures commonly used in plastics processing equipment.

Attempts have been made to overcome this disadvantage by mixing polyacrylonitriles, especially acrylonitrile copolymers, with various resins having a high heat distortion temperature. Although, several compounds and blends containing acrylonitrile copolymers have been reported, such blends typically are based on acrylonitrile copolymers containing up to 80% acrylonitrile and 20% or more of olefinically unsaturated carboxylic acid esters and/or a rubbery component. These acrylonitrile copolymers are often referred to as "high nitrile" co-polymers. Materials such as these are commercially available under the tradename of Barex® from British Petroleum. Although it has been reported that films have been cast from blends of such "high nitrile" acrylonitrile copolymers and certain compatible thermoplastic polymers containing polar groups that were mixed in a mutual solvent such as dimethylformamide (DMF), these blends were not shown to be melt extrudable. Other compositions have been reported that contain blends of "high nitrile" copolymers with components such as acrylo-indene copolymers, hydrophobized polyamides 11 and 12, and the like. However, in each of the foregoing blended compositions, the "high nitrile" component is an acrylonitrile copolymer containing 70% to 80% or less of the acrylonitrile monomer. Melt extrudable polyacrylonitrile compositions plasticized with fugitive solvents have also been described; however, such compositions require removal and expensive recovery of the solvent or solvents.

The lack of thermostability of polyacrylonitriles has been of great concern since their first use in the manufacture of acrylic fibers. In particular, discoloration due to thermal decomposition is a major problem in thermoplastic blends containing substantial amounts of polyacrylonitriles. A broad spectrum of compounds has been used in an attempt to combat the yellow discoloration that occurs even in the solution spinning of fibers. These compounds have included salts of Ca, Sr, Mg, Mn and Al, and maleic acid, maleic acid anhydride, maleates, boron compounds, and the like.

Therefore, despite their low cost and excellent gas barrier properties, polyacrylonitriles have been underutilized as engineering materials. The use of polyacrylonitrile today is virtually limited to fiber production and the manufacture of acrylonitrile-butadiene-styrene (ABS) terpolymers and a few other copolymers.

Therefore, there is a need to provide compositions containing polyacrylonitrile that are thermoplastic and, thus, are melt extrudable. Such compositions would be useful as engineering materials with good oxygen and carbon dioxide barrier properties in the packaging industry, as well as blow molded containers for the food and beverage industries, and the like.

SUMMARY OF THE INVENTION

It has unexpectedly been discovered that melt-extrudable, injection moldable and/or blow moldable compositions comprising polyacrylonitriles that contain greater than 90% acrylonitrile as monomer, or copolymers of such polyacrylonitriles with an olefinic unsaturated co-monomer, can be formed by the use of certain compatibilizers and/or thermal stabilizers. It has also unexpectedly been discovered that melt-extrudable, injection moldable and/or blow moldable compositions comprising the high nitrile polyacrylonitriles can be obtained by melt blending the polyacrylonitriles with certain aromatic engineering thermoplastic polymers in the presence of compatibilizers and thermal stabilizers. All of the foregoing high nitrile compositions have been found to possess good optical and gas barrier properties, and good stress crack resistance. Further, compositions containing the high nitrile polyacrylonitriles and the aromatic thermoplastic polymers also have increased heat distortion temperatures.

In one aspect of the invention, the thermoplastic compositions can comprise about 85% to about 95% of the polyacrylonitrile component, and about 5% to about 15% of an additive package that includes a compatibilizer, a thermal stabilizer, and an optional processing aid. In another aspect of the invention, the thermoplastic compositions according to the invention can comprise about 25% to about 95% of a polyacrylonitrile comprising greater than 90% of an acrylonitrile monomer, and about 25% to about 75% of an aromatic thermoplastic resin, where the remainder of the composition can comprise an additive package including a compatibilizer, a thermal stabilizer, and an optional processing aid.

Most suitably, compatibilizers for use in the composition comprise compounds that are at least partially soluble in the thermoplastic compositions and have a strong dipole moment. Suitable thermal stabilizers can be, but are not limited to, salts of Ca, Sr, Mg, Mn and Al, and maleic acid or maleic acid anhydride, boron compounds, and the like.

In addition to the high-nitrile thermoplastic compositions, the invention provides extruded, injection molded or blow molded articles made from the compositions and having good optical and gas barrier properties, and good stress crack resistance.

DETAILED DESCRIPTION OF THE INVENTION

The present invention is directed, in one aspect, toward the use of high nitrile polyacrylonitrile resins, i.e., polyacrylonitrile resins containing more than 90% acrylonitrile as monomer, in combination with certain compatibilizers and thermal stabilizers, to produce thermoplastic compositions that have good optical and gas barrier properties, and good stress crack resistance.

In a second aspect, the invention is directed toward the use of such high nitrile polyacrylonitrile resins in combination with aromatic engineering thermoplastic polymers, to produce thermoplastic compositions that combine the useful properties of both components. The thermoplastic co-resins suitable for use in the compositions of the invention can be any aromatic thermoplastic polymer belonging to the family of aromatic engineering thermoplastic polymers that can enhance the thermal and mechanical properties of the composition while maintaining the stress crack resistance and impermeability of the polyacrylonitrile.

The invention includes melt-extrudable, injection moldable and/or blow moldable transparent, low cost thermoplastic compositions and articles made from them. Such compositions and articles can have many uses such as, but not limited to, transparent gas barrier films and containers for packaging, low emission fuel tanks, sheet for vacuum forming of packages for the food and pharmaceutical industries, blow-molded bottles and containers for the food and beverage industries, low cost engineering thermoplastic blends with high heat distortion, and the like. The thermoplastic compositions of the invention also have good adhesion to mineral fillers and glass fibers and can be used for various engineering applications involving reinforcement with such materials.

In particular, the compositions according to the invention contain a polyacrylonitrile that comprises greater than 90% of an acrylonitrile monomer. In one aspect of the invention, the polyacrylonitrile can be a copolymer suitably comprising about 1% to about 5% of an olefinic unsaturated co-monomer. In another aspect of the invention, the polyacrylonitrile can be a copolymer comprising about 95% of the acrylonitrile monomer and about 5% of a vinyl acetate co-monomer. For example, any commercially available fiber grade polyacrylonitrile resin having an acrylonitrile monomer content of greater than 90% is suitable for use in the invention compositions.

In one aspect of the invention, the thermoplastic compositions can comprise about 85% to about 95% of the polyacrylonitrile component, and about 5% to about 15% of an additive package that includes a compatibilizer, a thermal stabilizer, and an optional processing aid. In another aspect of the invention, the thermoplastic compositions according to the invention can comprise about to about 95% of a polyacrylonitrile comprising greater than 90% of an acrylonitrile monomer, about 25% to about 75% of an aromatic thermoplastic resin, where the remainder of the composition can include an additive package including a compatibilizer, a thermal stabilizer, and an optional processing aid.

Aromatic engineering thermoplastic resins suitable for use in the invention compositions can include, but are not limited to, polycarbonates, polyphenylene ethers, polystyrene-co-maleic acid anhydride, and others selected from the family of such resins. For purposes of the invention, these resins can be used alone or in combination with other resins of the same or another compatible family.

Compatibility between the polyacrylonitrile and other components of the thermoplastic compositions can be achieved by the use of additives, especially those that are at least partially soluble in the compositions and have strong dipole moments. Such additives are known to those skilled in the art of polymer compounding. For example, suitable compatibilizers or plasticizers for use in the invention compositions include, but are not limited to, fatty alcohols, hydroxy fatty acids, polyglycols, aryl sulfonamides, alkyl diols, erythritols, pentanols, hexanols, polyols, carbon monoxide-containing aliphatic terpolymers, phenoxy resins, combinations of these, and the like. More specifically, such compatibilizers can include, but are not limited to, benzene sulfonamides and toluene sulfonamides and N-substituted derivatives of these, lauryl alcohol, cyclohexane-dimethanol, glycolic acid, lactic acid, polyethylene glycol, polypropylene glycol, penta-erythritol, erythritols, glycerine, sorbitol, N-ethyl-p-toluene sulfonamide, N-bis(hydroxyethyl) alkyl tosylate, N-butyl benzene sulfonamide, bis-2-hydroxyethyl cocoamine, polycaprolactone, polyvinyl pyrrolidone, combinations of these, and the like. In particular, it was found that glycolic acid is a good solvent for polyacrylonitrile resin in the melt stage. In combination with a thermal stabilizer package containing boric acid with or without aluminum sulfate, as described in the examples below, a film with very good optical properties can be produced.

Thermal stabilizers for use in the invention compositions can include, but are not limited to, consisting of salts of calcium, strontium, magnesium, manganese, aluminum, and the like. Such thermal stabilizers are well known in the literature. Further thermal stabilizers can include, as non-limiting examples, maleic acid, maleic acid anhydrides, boron compounds, and the like. Boron compounds, such as boric acid, ortho-boric acid, boric oxide, and the like are very suitable in the invention compositions, as is aluminum sulfate. A particularly suitable boron compound is trimethoxyboroxine. This compound forms boric acid in "statu nascendi" when hydrolyzed or pyrolyzed during the step of melt processing.

Optional processing aids can be any of those known in the art of melt blending and extrusion. As non-limiting examples, these can include mold release agents, lubricants, anti-blocking agents, antistatic agents, antioxidants, waxes, and the like. Mineral fillers such as, but not limited to, diatomaceous earth, mica, talc, nepheline, and the like, can be useful as reinforcing agents. Other useful reinforcing agents can include, but are not limited to, milled glass filler, chopped fiber glass filler, and the like.

The amounts of the compatibilizer, thermal stabilizer and optional processing aids will depend on the selection and amount of the aromatic thermoplastic resin, if used, as well as the amount of the polyacrylonitrile in the composition, as is known in the art of polymer processing.

The thermoplastic polymer compositions according to aspects of the invention are usually obtained by mixing the polymers with the compatibilizer, thermal stabilizer and any other optional additives, followed by melt blending the composition. The polyacrylonitrile and the optional aromatic thermoplastic resin can be in pellet, powdered or flake form, or the like; however, fiber grade polyacrylonitrile usually is supplied in powder form. The method of making the thermoplastic compositions is not intended to be limited to any one method of mixing or melt blending the components. For example, mixing or melt blending of components, including any additives if used, can be by batch compounding such as in a Banbury mixer, or can be by continuous compounding in an extruder. For example, in one aspect of the method, the dry (and liquid, if present) components of the composition can be mixed prior to single screw or twin screw extrusion. In another embodiment, the dry (and liquid, if present) components can be separately fed through separate ports into an extruder. In yet another embodiment, the components of the composition can be pre-combined in a mixer, such as a Banbury mixer, preferably under high intensity blending, to form a hot melt which then can be combined with a third component (e.g., a let-down resin) in an extruder to produce the desired percentages of each of the components in the final composition. The temperatures and other variables required for dry blending, hot melts, and melt blending are well known to those skilled in the art.

Following extrusion of the components, the composition can be pelletized for injection molding, blow molding, rolling, milling, extrusion of sheet or film, or for forming or fabricating in any manner whatsoever to form the desired product by known methods. Once the teachings herein are in hand, the skilled practitioner of this invention will be able to adapt conventional methods of forming material, such as injection molding and other techniques mentioned above, to the production of desired articles of manufacture using the compositions according to the invention. This adaptation can be implemented on an empirical basis, without undue experimentation.

EXAMPLES

The following examples illustrate methods of preparation of representative thermoplastic compositions of high nitrile polyacrylonitrile polymers, compatibilizers, thermal stabilizers and additive packages, including optional aromatic engineering thermoplastic resins. However, the examples are not intended to be limiting, as other polyacrylonitrile polymers containing greater than 90% of acrylonitrile monomers, other aromatic thermoplastic resins, other compatibilizers, other thermal stabilizers, and other additives can be prepared according to the described methods. Moreover, the methods are exemplary only and other methods for preparing the thermoplastic compositions of the invention can be determined by those skilled in the art without departing from the scope of the invention herein disclosed and claimed.

Experimental Procedures

Specific equipment and test procedures were selected to facilitate working with small samples, e.g., up to five grams of mixed polymer powders and added components, also in powder form or as liquids. The powder mixture was compression molded.

The compression mold consisted of a 4"×4"×2" aluminum base with a 2"×2"×¾" deep cavity and a 2"×2"×2" male plug machined for a slip fit. Both mold parts were heated by cartridge heaters. The mold temperature was controlled by a solid state temperature controller and a "J" type thermocouple.

Aliquots of 1.5 to 2.5 g of the composition to be tested were intensively mixed, dried as needed, and transferred into the heated mold cavity. The male part of the mold was then placed inside the cavity and the assembled mold was placed in a press at a load of 600 psi. A mold cycle of five minutes was controlled by a timer. At the end of the cycle, power to the heaters was turned off, the cartridge heaters and the thermocouples were quickly removed, and the mold was submerged for five minutes in cold water. The mold was then opened and a melt cake was removed for drying and testing.

An alternate method of compression molding was used by placing 1.5 to 2.5 grams of the powder composition through a powder funnel in the center of a 4"×4"×⅛" aluminum plate that was covered with a Teflon-coated woven glass cloth. Another sheet of Teflon/glass cloth and aluminum plate were carefully placed on top of the powder and pressed down to flatten the powder sample. The sandwich was then placed between temperature controlled platens of a Burton press at a load of 2500 lbs for 5 minutes at the desired temperature. The sandwich was removed, shock cooled in water and the sample was dried at 75° C.

Test Procedures

In the case of preparing a sample in the 2"×2" compression mold, depending on the melt viscosity, up to 100% of the 4 square inch area may be covered by the melt. Thus the melt viscosity could be assessed relatively as a percentage of mold area covered by the melt cake.

In the case of preparing a sample between heated plates, the melt cake assumes the shape of a circle. The calculated area was then a measure of the relative melt viscosity.

In addition to the flow area the following properties were measured and recorded:
  Thickness (mil).
  Light transmission (%), haze and clarity were measured by a Byk-Gardner Haze-Gard Plus Instrument.
  Hardness ($kg/cm^2$) was measured with a penetrometer, at a load of 227 grams of a hemispherical foot 0.6 cm in diameter over time period up to 128 minutes. The anvil of the unit was temperature controlled.
  Color was determined by visual observation according the following scale: cream, light beige, beige, light tan, tan, light brown and brown.
  Microscopic evaluation was performed at a magnification of 130× with a through-light to visually determine homogeneity or lack thereof.

Extrusion Procedure

To verify the results obtained by compression molding, selected compounds were extruded on a 1" single screw extruder equipped with a 3" slot die, and, for scale-up, on a 54" twinscrew extruder. The extruded articles were then subjected to the same tests as described above.

Materials

In the examples below, the following materials were employed:
A. Polyacrylonitrile (PAN) copolymers:
  (a) Solutia PAN (A-75)—a fiber grade copolymer containing 95% acrylonitrile and 5% vinylacetate as co-monomers, having a molecular weight of about 100,000 or more (Solutia, Inc., Decatur Ala.)
  (b) Sterling PAN—a fiber grade copolymer containing 95% acrylonitrile and 5% vinylacetate as co-monomers, having a molecular weight of about 60,000 (Sterling Chemicals Inc., Houston Tex.)
B. Thermoplastic polymers as co-resins:
  (a) Polycarbonate, injection molding grade (General Electric)
  (b) BHBP 820—polyphenylene oxide (PPO), high molecular weight (General Electric)
  (c) BHBP 857—polyphenylene oxide (PPO), low molecular weight (General Electric)
  (d) DYLARK® 332—styrene maleic anhydride (NOVA Chemicals, Pittsburgh Pa.)
C. Compatibilizers:
  (a) (pTSA)—para-toluene sulfonamide
  (b) S8—N-(ethyl)-p-toluene sulfonamide with a minor component of ortho-toluene sulfonamide
  (c) Uniplex 214—N-butyl benzene sulfonamide (Unitex Chemical Co., Greensboro N.C.)
  (d) 12-HSA—12-hydroxystearic acid
  (e) EBS—ethylene bis-stearamide
  (f) PVP—polyvinylpyrrolidone
  (g) CHDM—cyclohexylene-dimethanol
  (h) PEG 600—polyethylene glycol, molecular weight about 600
  (i) PPG 2000—polypropylene glycol, molecular weight about 2000
  j) Glycolic acid
  (k) Polycaprolactone
D. Thermal Stabilizers:
  (a) TMBX—trimethoxyboroxine
  (b) Orthoboric acid
  (c) Aluminum sulfate E. Other Additives:
(a) INT 34—mold release agent (AXEL Plastic Research Laboratories, Inc., Woodside N.Y.)
(b) 106G—a proprietary antistatic chemical, described in U.S. Pat. No. 3,933,779
(c) Silicon oil
(d) Polyethylene wax 500

Example 1

Ten grams of A-75 polyacrylonitrile, 4.5 g of a polycarbonate, 1.5 g of N-(ethyl) p-toluene sulfonamide and 0.85 g of an aliquot of an additive package were intensively mixed in a two-speed Waring® blender with a pulverizing attachment. The additive package was a mixture of 1.2 g boric oxide, 0.8 g silicon oil, 0.4 g polyethylene wax 500 and 1.1 g of A-75. The composition was intensively mixed in the blender. All materials were used in powder form with the exception of N-(ethyl)-p-toluene sulfonamide which is a liquid. An aliquot of 2.5 g of the mixture was dried at 70° C. for two hours and mixed again for two minutes. The powder was then compression molded and tested, as described above. The results are illustrated in Table 1.

TABLE 1

| Compression Temperature (° F.) | Thickness (mil) | Flow Area (%) | Light Transmission (%) | Color |
|---|---|---|---|---|
| 400 | 46.0 | 60 | 29.0 | light beige |
| 420 | 46.5 | 65 | 29.9 | beige |
| 440 | 46.5 | 70 | 32.3 | tan |

Upon microscopic evaluation, it was found that the samples were homogenous under through-light at 130× magnification. No areas of unmelted powder were observed.

Example 2

A powder blend illustrated in Table 2 was prepared for extrusion on a one inch extruder equipped with a 3" slot die.

TABLE 2

| Composition of Blend of Example 2 | |
|---|---|
| A-75 | 110.00 g |
| PPO* | 100.00 g |
| p-TSA | 5.25 g |
| 12-HSA | 6.60 g |

TABLE 2-continued

| Composition of Blend of Example 2 | |
|---|---|
| EBS | 2.00 g |
| INT34 | 1.00 g |
| TMBX | 12.00 cc |

*BHBP 820

A strip of the mixture, having a width of 2.8 inches and a thickness of 21.5 mil was extruded. The color was light tan and the light transmission ranged from 38% to 42%. Microscopic evaluation showed good homogeneity and uniformity. The final hardness was 364.8 kg/cm$^2$ at 73° F. and 109.5 kg/cm$^2$ at 257° F.

Example 3

Two 2.0 g aliquots of the powder blend of Example 2 were compression molded, one at 430° F. and the other at 440° F., with a cycle time of five minutes. The results of testing these aliquots are illustrated in Table 3.

TABLE 3

| Compression Temperature (° F.) | Thickness (mil) | Flow Area (%) | Light Transmission (%) | Hardness (kg/cm$^2$) | Color |
|---|---|---|---|---|---|
| 430 | 24-29 | 94 | 40.2-47.7 | 136.6 @73° F. | Light tan |
| 440 | 27-33 | 93 | 30.2-43.5 | 136.6 @73° F. | tan to light brown. |

A comparison of the data of Example 2 and Table 3 illustrates that the hardness of the extruded samples (Example 2) was considerably higher than that of the compression molded samples (Example 3). The reason for this is that the compression pressure in the compression molding process was only 285 psi compared to 3,500 psi in extrusion. Also, in the process of powder compression, the shear rate is extremely low. It does, however, validate the compression molding process as a conservative indicator of properties to be expected by extrusion.

Example 4

Various compatibilizers were tested in compounds containing 49% A-75 polyacrylonitrile and 45% polyphenylene oxide. The results from the two gram melt cakes prepared by the procedure described above are shown in Table 4.

TABLE 4

| Compatibilizer | Thickness (mil) | Flow Area (%) | Light Transmission (%) | Color | Hardness @ 73° F. (kg/cm$^2$) | Hardness @ 257° F. (kg/cm$^2$) |
|---|---|---|---|---|---|---|
| S8 | 27-33 | 91.5 | 28.6-32.4 | lt. tan | 133.8 | 58.7 |
| 106G | 29-45 | 64.8 | 24.5-30.5 | Tan | 227.2 | 129.5 |
| pTSA | 27-39 | 85.9 | 24.3-42.1 | lt. tan | 293.7 | 120.4 |
| PVP | 31-40 | 65.3 | 19.9-30.6 | Tan | 160.5 | 78.7 |
| 12-HSA | 26-34 | 86.7 | 34.8-41.2 | Cream | 200.7 | 104.7 |
| CHDM | 29-40 | 82.5 | 23.0-33.5 | lt. tan | 109.5 | 50.2 |
| PEG 600 | 25-34 | 88.0 | 25.6-31.2 | Cream | 325.4 | 91.2 |
| PPG 2000 | 37-48 | 85.0 | 26.5-30.5 | Cream | 481.6 | 66.9 |

Example 5

Compositions containing 73% A-75 polyacrylonitrile, 20% polyphenylene oxide and 20% styrene maleic anhydride (Dylark® 332,) respectively, were compression molded as described above. The four compositions contained as a compatibilizer 3.63% of p-toluene sulfonamide and 12-hydroxy stearic acid, respectively. An evaluation of the resulting compounds is shown in Table 5.

TABLE 5

| | PPO | | Dylark ® 332 | |
|---|---|---|---|---|
| Property | p-TSA | 12-HSA | p-TSA | 12-HSA |
| Thickness (mil) | 47 | 41.5 | 40 | 41.5 |
| Flow Area (%) | 50.9 | 53.2 | 62.4 | 82.9 |
| Light Transmission, % | 30.6 | 20 | 44.1 | 32.1 |
| Color | Beige | beige | lt. beige | lt. beige |
| Hardness @ 73° F. (kg/cm$^2$) | 401 | 301 | 301 | 201 |
| Hardness @ 257° F. (kg/cm$^2$) | 301 | 201 | 60 | 120 |

Example 6

2.5 g of a powder containing 47% A-75 polyacrylonitrile, 40% polycarbonate, 12% polycaprolactone, 0.5% boric acid and 0.5% polyethylene wax were intensively mixed and then dried for 24 hours at 55° C. The mixture was charged into the mold at 420° F. and pressed for 5 minutes at 200 psi. The melt cake had a thickness of 45 mil, a flow area of 62%, light transmission of 22% and the color was light tan.

Example 7

Two grams of powder containing 81.5% of Sterling fiber grade polyacrylonitrile, 4.07% of penta-erythritol, 9.37% of Uniplex 214 (N-butyl benzene sulfonamide), 4.24% of boric acid, and 0.81% of aluminum sulfate were intensively mixed and then dried for 2 hours at 75° C. The sample was pressed between plates at 380° F. for a cycle of 5 minutes and a pressure load of 2600 lbs. The properties of the resulting melt cake are shown in Table 6.

TABLE 6

| Thickness: | 7.2 to 15.2 mil | Flow area: | 3.0" diameter |
|---|---|---|---|
| Color: | very light beige | Light Transmission: | 86.1 to 87.5% |
| Haze: | 27.6 to 33.8 | Clarity: | 32.9 to 42.2 |

Example 8

Another sample was prepared according to Example 7, except that the Sterling polyacrylonitrile was replaced by Solutia polyacrylonitrile. The properties of the resulting melt cake are shown in Table 7.

TABLE 7

| Thickness: | 13.1 to 17.5 mil | Flow area: | 2.25" diameter |
|---|---|---|---|
| Color: | very light beige | Light Transmission: | 70.0 to 70.9% |
| Haze: | 61.1 to 64.9 | Clarity: | 38.9 to 42.8 |

Since the two fiber grade resins differ only in molecular weight (the Sterling resin has a MW of about 60,000, whereas the Solutia resin has a MW of more than 100,000), it was to be expected therefore that the viscosity of the sample employing the Solutia resin would be higher than that of the of the sample employing the Sterling resin.

A comparison of hardness of the compression molded and the extruded sample (Examples 3 and 5) was made. The thickness, light transmission and color are nearly the same for both products. On the other hand the data demonstrate that the hardness of the extruded sample is substantially higher at both temperatures. The reason for this is that the compaction and the applied shear rate are much greater than those of the compression molded sample. This substantiates the fact that the experimental approach based on small amounts of compression molded powder compositions yields very conservative results compared to commercial processing.

Example 9

1.5 grams of a composition containing 88.4% Sterling polyacrylonitrile, 7.1% glycolic acid, 3.7% boric acid and 0.7% aluminum sulfate were intensively mixed and dried for two hours at 75° C. A melt cake was prepared by pressing the powder between heated plates at 380° F. for 5 minutes at a pressure load of 2600 lbs. The properties of the resulting melt cake are shown in Table 8.

TABLE 8

| Thickness: | 8.7 to 14.0 mil | Flow area: | 2.5" diameter |
|---|---|---|---|
| Color: | very light yellow | Light Transmission: | 84.4 to 86.4% |
| Haze: | 19.6 to 21.1 | Clarity: | 38.5 to 42.7 |

Example 10

1.5 grams of a composition containing 86.1% Solutia polyacrylonitrile, 8.6% glycolic acid, 4.5% boric acid and 0.9% aluminum sulfate were intensively mixed and dried for two hours at 75° C. A melt cake was prepared according to Example 9, except that the temperature of the press was 400° F. The properties of the resulting melt cake are shown in Table 9.

TABLE 9

| Thickness: | 20.2 mill | Flow area: | 1.75" diameter |
|---|---|---|---|
| Color: | light brown | Light Transmission: | 74.7% |
| Haze: | 11.9 | Clarity: | 61.5 |

Example 11

To more closely evaluate glycolic acid as a compatibilizer, seven compositions containing Solutia polyacrylonitrile, pure glycolic acid, Glypure® (DuPont™) with and without boric acid were prepared. The amounts of the respective ingredients are listed in Table 10. Samples (1.5 to 2.0 grams) of the mixture having various thicknesses were compression molded under the conditions listed in Table 10, which also illustrates an evaluation of the resulting compounds.

It is shown that samples F and G, containing a combination of 9.7% glycolic acid as compatibilizer and 2.74% boric acid as thermal stabilizer had the lowest haze values and, therefore, the best optical results.

TABLE 10

| Composition | A | B | C | D*** | E | F | G |
|---|---|---|---|---|---|---|---|
| | | | | Sample Number | | | |
| Sterling PAN (g) | 67.1 | 67.1 | 90.0 | 89.9 | 89.9 | 87.6 | 87.6 |
| Glycolic Acid* (g) | 32.9 | 32.9 | 10.0 | 9.9 | 9.9 | 9.7 | 9.7 |
| Boric Acid (g) | 0 | 0 | 0 | 0 | 0 | 2.74 | 2.74 |
| Weight, grams | 1.5 | 1.5 | 2 | 2 | 2 | 2 | 2 |
| Temperature ° F. | 330 | 300 | 400 | 375 | 380 | 380 | 400 |
| Cycles/minute | 5 | 5 | 5 | 5 | 5 | 5 | 5 |
| Pressure, psi | 110 | 110 | 110 | 110 | 110 | 110 | 110 |
| Flow diameter, inches | 3.0"+ | 3.0" | 3.2" | 3.0" | 3.0" | 2.5" | 3.0" |
| Thickness | 3.0-11.0 | 6.0-16.5 | 6.5-19.0 | 2.3-10.8 | 14.0-20.0 | 15.8-18.9 | 16.6-20.8 |
| Light Transmission, % | 81.2-88.8 | 61.1-84.8 | 80.5-85.7 | 79.1-86.3 | 78.3-81.8 | 84.3-84.7 | 82.0-83.6 |
| Haze | 54.2-54.9 | 63.6-97.4 | 18.4-26.9 | 25.9-29.1 | 11.5-16.0 | 8.64-10.9 | 10.6-13.0 |
| Clarity | 49.0-59.5 | 20.8-31.0 | 43.9-49.2 | 39.7-46.8 | 51.1-60.9 | 58.4-67.2 | 43.9-52.9 |
| Color | white clear | white clear | light lemon** | light lemon | very light brown | very light beige | very light beige |

*added as solution
**black edge on thick side
***added 1% water, not homogenous

Example 12

A further composition containing 87.5% Solutia polyacrylonitrile, 8.75% of pure glycolic acid and 4.75% of orthoboric acid was blended according to the method of Example 10. At a thickness of 1.6 mil, the compression molded sample had a light transmission of 84.5%, a haze of 9.77% and a clarity (contrast) of 62.8%. The high clarity of this product makes it an excellent candidate for a high clarity barrier film with an extremely low rate of oxygen permeation. A typical use would be for clear packaging of foods that are sensitive to spoilage by ingress of oxygen.

Example 13

The effect of increasing the heat distortion temperature by combining the extruded or compression molded compound with 20% milled or chopped glass fibers was investigated. The composition contained 110 g A-75 polyacrylonitrile, 75 g polyphenylene oxide (BHBP 820,) 25 g polyphenylene oxide (BHBP 857,) 5.25 g pTSA, 5.25 g 12-HSA, 2.0 g EBS, 1.0 g INT34 and 12.0 cc TMBX. The composition was weighed, and 20% by weight of either milled glass or chopped fiberglass strands were added. The hardness of compression molded samples was measured as described previously, at 73° F. and 257° F. (the maximum temperature to which parts or products might be exposed, for example, in automobiles).

As illustrated by the data in Table 11, the final harness of the glass-filled compound is more than twice that of the unreinforced compound.

In samples containing chopped glass fibers, a fiber pull test showed strong adhesion of the glass fibers to the polymer matrix. Such strong adhesion is important for providing the mechanical properties of glass fiber reinforced compositions.

TABLE 11

| Minutes | Hardness with glass reinforcement 73° F. (kg/cm$^2$) | Hardness with glass reinforcement 257° F. (kg/cm$^2$) | Hardness without glass reinforcement 73° F. (kg/cm$^2$) | Hardness without glass reinforcement 257° F. (kg/cm$^2$) |
|---|---|---|---|---|
| 2 | 602.0 | 481.6 | 301.0 | 172.0 |
| 4 | 401.3 | 250.8 | 211.2 | 66.9 |
| 8 | 301.0 | 160.5 | 172.0 | 54.7 |
| 16 | 301.0 | 146.8 | 154.4 | 51.2 |
| 32 | 301.0 | 120.4 | 143.3 | 45.8 |
| 64 | 301.0 | 104.7 | 138.4 | 44.3 |
| 128 | 301.0 | 89.2 | 136.8 | 43.0 |

Example 14

To relate the hardness test to commercial engineering plastics, the hardness values for commercial high impact polystyrene (HIPS) and acrylo-butadiene-stryene terpolymer (ABS) were compared to the hardness values for the polyacrylonitrile/polyphenylene oxide (PAN/PPO) glass reinforced compound of Example 13. As illustrated in Table 12, it is shown that the hardness of PAN/PPO blend at both temperatures is superior to HIPS and ABS. At room temperature the hardness of the PAN/PPO blend is nearly twice the hardness of HIPS while at 257° F. the hardness values of the PAN/PPO blend is significantly higher than that of both HIPS and ABS. This data illustrates that in the PAN/PPO blend, the inherent hardness of the polyacrylonitrile has been retained, while the addition of the polyphenylene oxide has significantly increased the heat distortion temperature to enable the production of a melt-extrudable polyacrylonitrile blend.

TABLE 12

| Min. | HIPS 73° F. Hardness (kg/cm²) | HIPS 257° F. Hardness (kg/cm²) | ABS 73° F. Hardness (kg/cm²) | ABS 257° F. Hardness (kg/cm²) | PAN/PPO 73° F. Hardness (kg/cm²) | PAN/PPO 257° F. Hardness (kg/cm²) |
|---|---|---|---|---|---|---|
| 2 | 401.3 | 133.8 | 802.7 | 602.0 | 602.0 | 401.3 |
| 4 | 344.0 | 74.3 | 401.3 | 240.8 | 481.6 | 150.5 |
| 8 | 267.6 | 23.1 | 364.8 | 138.4 | 364.8 | 133.8 |
| 16 | 231.5 | 16.1 | 301.0 | 109.5 | 364.8 | 124.1 |
| 32 | 200.7 | 14.3 | 301.0 | 98.7 | 364.8 | 118.1 |
| 64 | 191.0 | 8.1 | 301.0 | 81.9 | 364.8 | 109.5 |
| 128 | 191.0 | 7.7 | 301.0 | 81.9 | 364.8 | 109.5 |

While the invention has been described herein with reference to the preferred embodiments, it is to be understood that it is not intended to limit the invention to the specific forms disclosed. On the contrary, it is intended that the invention cover all modifications and alternative forms falling within the scope of the appended claims.

We claim:

1. A melt blendable thermoplastic composition, comprising
   (a) about 85% to about 95% of a polyacrylonitrile that comprises greater than 90% of an acrylonitrile monomer; and
   (b) about 5% to about 15% of a thermostabilizing package comprising:
      (i) a compatibilizer having a strong dipole moment and/or at least partial solubility in the polyacrylonitrile;
      (ii) a thermal stabilizer selected from the group consisting of a calcium salt, a strontium salt, a magnesium salt, a manganese salt, an aluminum salt, a maleic acid, a maleic acid anhydride, a boron compound, glycolic acid, and combinations thereof; and
      (iii) an optional processing aid.

2. The melt blendable composition of claim 1, wherein the polyacrylonitrile comprises about 1% to about 5% of an olefinic unsaturated co-monomer.

3. The melt blendable composition of claim 2, wherein the olefinic unsaturated co-monomer comprises a vinyl acetate.

4. The melt blendable composition of claim 3, wherein the polyacrylonitrile comprises about 95% of the acrylonitrile monomer and about 5% of the vinyl acetate co-monomer.

5. The melt blendable composition of claim 1, wherein the compatibilizer is selected from the group consisting of a fatty alcohol, a hydroxy fatty acid, a polyglycol, an aryl sulfonamide, an alkyl diol, an erythritol, a pentanol, a hexanol, a polyol, a carbon monoxide-containing aliphatic terpolymer, a phenoxy resin, glycolic acid, and combinations thereof.

6. The melt blendable composition of claim 5, wherein the compatibilizer is selected from the group consisting of a benzene sulfonamide, a toluene sulfonamide, lauryl alcohol, cyclohexane-dimethanol, glycolic acid, lactic acid, polyethylene glycol, polypropylene glycol, penta-erythritol, erythritols, glycerine, sorbitol, N-ethyl-p-toluene sulfonamide, N-bis(hydroxyethyl) alkyl tosylate, N-butyl benzene sulfonamide, bis-2-hydroxyethyl cocoamine, polycaprolactone, polyvinyl pyrrolidone, and combinations thereof.

7. The melt blendable composition of claim 1, wherein the compatibilizer comprises glycolic acid.

8. The melt blendable composition of claim 1, wherein the thermal stabilizer is selected from the group consisting of aluminum sulfate, boric acid, ortho-boric acid, boric oxide, trimethoxyboroxine, glycolic acid, and combinations thereof.

9. The melt blendable composition of claim 1, wherein the thermal stabilizer comprises boric acid.

10. The melt blendable composition of claim 1, wherein the optional processing aid is selected from the group consisting of a mold release agent, a lubricant, an anti-blocking agent, an antistatic agent, an antioxidant, a wax, and combinations thereof.

11. The melt blendable composition of claim 1, wherein the composition further comprises a reinforcing mineral filler.

12. The melt blendable composition of claim 11, wherein the mineral filler is selected from the group consisting of diatomaceous earth, mica, talc, nepheline, and mixtures thereof.

13. The melt blendable composition of claim 1, wherein the composition further comprises a reinforcing filler selected from the group consisting of a milled glass filler, a chopped fiber glass filler, and mixtures thereof.

14. An extruded, injection molded or blow molded article having transparency, gas barrier properties, and stress crack resistance, comprising a melt blended thermoplastic composition that comprises:
   (a) about 85% to about 95% of a polyacrylonitrile that comprises greater than 90% of an acrylonitrile monomer; and
   (b) about 5% to about 15% of a thermostabilizing package comprising:
      (i) a compatibilizer having a strong dipole moment and/or at least partial solubility in the polyacrylonitrile;
      (ii) a thermal stabilizer selected from the group consisting of a calcium salt, a strontium salt, a magnesium salt, a manganese salt, an aluminum salt, a maleic acid, a maleic acid anhydride, a boron compound, glycolic acid, and combinations thereof: and
      (iii) an optional processing aid.

* * * * *